(12) United States Patent  
Inoue et al.

(10) Patent No.: US 9,997,293 B2  
(45) Date of Patent: Jun. 12, 2018

(54) CERAMIC ELECTRONIC COMPONENT AND MANUFACTURING METHOD THEREFOR

(71) Applicant: Murata Manufacturing Co., Ltd., Nagaokakyo-shi, Kyoto-fu (JP)

(72) Inventors: Mitsunori Inoue, Nagaokakyo (JP); Tomohiko Mori, Nagaokakyo (JP)

(73) Assignee: MURATA MANUFACTURING CO., LTD., Nagaokakyo-Shi, Kyoto-Fu (JP)

(*) Notice: Subject to any disclaimer, the term of this patent is extended or adjusted under 35 U.S.C. 154(b) by 112 days.

(21) Appl. No.: 14/805,525

(22) Filed: Jul. 22, 2015

(65) Prior Publication Data

US 2015/0325369 A1 Nov. 12, 2015

Related U.S. Application Data

(63) Continuation of application No. PCT/JP2014/051826, filed on Jan. 28, 2014.

(30) Foreign Application Priority Data

Jan. 29, 2013 (JP) .................................. 2013-014482

(51) Int. Cl.
*H01F 5/00* (2006.01)
*H01F 27/28* (2006.01)
(Continued)

(52) U.S. Cl.
CPC ........... *H01G 2/12* (2013.01); *C23C 18/1641* (2013.01); *C23C 18/1882* (2013.01);
(Continued)

(58) Field of Classification Search
CPC .................................. H01F 5/00; H01F 27/28
(Continued)

(56) References Cited

U.S. PATENT DOCUMENTS 6,214,685 B1 * 4/2001 Clinton .................. H01C 1/034  
438/382  
2001/0035810 A1 11/2001 Heistand, II et al.  
(Continued)

FOREIGN PATENT DOCUMENTS

JP H01-186607 A 7/1989  
JP H05-101910 A 4/1993  
(Continued)

OTHER PUBLICATIONS

International Search Report issued for PCT/JP2014/051826, dated Apr. 1, 2014.

(Continued)

*Primary Examiner* — Tsz Chan  
(74) *Attorney, Agent, or Firm* — Arent Fox LLP (57) ABSTRACT

A ceramic electronic component that includes a ceramic main body, a coating film and external electrodes on the surface of the ceramic main body. The coating film is selectively formed on the surface of the ceramic main body by applying, to the surface of the ceramic main body, a resin-containing solution that etches the surface of the ceramic main body so as to ionize constituent elements of the ceramic main body. The coating film includes a resin and the constituent elements of the ceramic main body, which were ionized and deposited from the ceramic main body.

8 Claims, 4 Drawing Sheets

(51) Int. Cl.
| | |
|---|---|
| *H01G 2/12* | (2006.01) |
| *C25D 7/00* | (2006.01) |
| *C23C 28/00* | (2006.01) |
| *H01C 7/10* | (2006.01) |
| *H01G 4/12* | (2006.01) |
| *H01C 7/02* | (2006.01) |
| *H01C 7/04* | (2006.01) |
| *H01F 41/00* | (2006.01) |
| *H01C 17/00* | (2006.01) |
| *H01F 27/23* | (2006.01) |
| *H01G 4/005* | (2006.01) |
| *H01C 17/02* | (2006.01) |
| *H01G 4/224* | (2006.01) |
| *H01G 4/30* | (2006.01) |
| *H01C 7/00* | (2006.01) |
| *H01C 7/102* | (2006.01) |
| *H01G 2/10* | (2006.01) |
| *C25D 5/54* | (2006.01) |
| *C25D 5/56* | (2006.01) |
| *C23C 18/16* | (2006.01) |
| *C23C 18/18* | (2006.01) |

(52) U.S. Cl.
CPC ............... *C23C 28/00* (2013.01); *C25D 5/54* (2013.01); *C25D 5/56* (2013.01); *C25D 7/00* (2013.01); *H01C 7/003* (2013.01); *H01C 7/02* (2013.01); *H01C 7/04* (2013.01); *H01C 7/10* (2013.01); *H01C 7/102* (2013.01); *H01C 7/1006* (2013.01); *H01C 17/00* (2013.01); *H01C 17/02* (2013.01); *H01F 27/23* (2013.01); *H01F 27/2804* (2013.01); *H01F 41/00* (2013.01); *H01G 2/103* (2013.01); *H01G 4/005* (2013.01); *H01G 4/12* (2013.01); *H01G 4/224* (2013.01); *H01G 4/30* (2013.01); *H01F 2027/2809* (2013.01)

(58) Field of Classification Search
USPC .................................................. 336/200, 232
See application file for complete search history.

(56) References Cited

U.S. PATENT DOCUMENTS

| | | | | |
|---|---|---|---|---|
| 2002/0050909 | A1* | 5/2002 | Jinno | H01C 1/034 338/21 |
| 2003/0134133 | A1 | 7/2003 | Kimura et al. | |
| 2005/0229388 | A1* | 10/2005 | Deng | H01C 1/028 29/621 |
| 2008/0305005 | A1* | 12/2008 | Kurokawa | B01J 19/0093 422/68.1 |

FOREIGN PATENT DOCUMENTS

| | | | |
|---|---|---|---|
| JP | H09-148105 A | | 6/1997 |
| JP | 10-233407 A | | 8/1998 |
| JP | 2000030911 A | | 1/2000 |
| JP | 2002-033237 A | | 1/2002 |
| JP | 2004-500719 A | | 1/2004 |
| JP | 2010-123865 A | | 6/2010 |
| JP | 2011204778 A | * | 10/2011 |
| JP | 2011-249615 A | | 12/2011 |
| JP | 2011249615 A | * | 12/2011 |
| JP | 2011249615 A | | 12/2011 |

OTHER PUBLICATIONS

Written Opinion of the International Searching Authority issued for PCT/JP2014/051826, dated Apr. 1, 2014.

* cited by examiner

CERAMIC ELECTRONIC COMPONENT AND MANUFACTURING METHOD THEREFOR

CROSS REFERENCE TO RELATED APPLICATIONS

The present application is a continuation of International application No. PCT/JP2014/051826, filed Jan. 28, 2014, which claims priority to Japanese Patent Application No. 2013-014482, filed Jan. 29, 2013, the entire contents of each of which are incorporated herein by reference.

BACKGROUND OF THE INVENTION

1. Field of the Invention

The present invention relates to a ceramic electronic component and a method for manufacturing the component.

2. Description of the Related Art

The ceramics for use in electronic components may be likely to be weakened against chemical erosion by acid or alkali, and also undergo a decrease in mechanical strength of themselves, because of improvements in material due to the sophisticated functions of the electronic components.

Therefore, as measures against this situation, techniques have been proposed for coating ceramic surfaces of electronic components with glass as in JP5-101910 A, or with resin as in JP2004-500719 A.

Coating the ceramic surfaces of the electronic components can reduce the influence of chemical erosion on the ceramics, which is caused by plating solution in the case of plating or flux in the case of mounting. Further, coating the ceramic surfaces can, in the case of plating, suppress the growth by plating onto the ceramic surfaces, and reduce defective conductivity of the ceramic.

Furthermore, coating the ceramic surfaces can prevent ingress of moisture, plating solutions, flux, etc. into the electronic components, and prevent reliability degradation of the electronic components, or electrical property degradation due to deposition by plating onto internal electrodes.

In addition, the formation of the coating film also shows the effect of improving the mechanical strength of the ceramics.

SUMMARY OF THE INVENTION

However, in the case of coating a ceramic surface of an electronic component with glass as in JP5-101910 A, there is a need for a firing step, thereby leading to an increase in manufacturing cost. Moreover, it is not possible to form any film with positional selectivity, because the glass coating is provided (applied) over the entire surface of the electronic component. Therefore, there is a need for a step of forming a glass coating film over the entire surface of the electronic component before the formation of external electrodes, and removing the glass coating film on end surfaces of the electronic component on which external electrodes are to be formed, and the manufacturing cost is thus increased.

It is to be noted that while it is also possible to form external electrodes without carrying out the step of removing the glass coating film, some of the constituent elements of the glass coating film at interfaces in contact with the surfaces of the external electrodes diffuse into the external electrodes at the time of firing. However, in this case, there is a limit on the thickness of the glass coating film, and the management for mass production will become complicated.

In addition, in the case of coating a ceramic surface of an electronic component with resin as in JP2004-500719 A, it is not possible to form any film with positional selectivity, because the resin coating is provided (applied) over the entire surface of the electronic component, as in the case of the glass coating. Therefore, there is a need for a step of forming a resin coating film over the entire surface of the electronic component before the formation of external electrodes, and removing the resin coating film on end surfaces of the electronic component on which external electrodes are to be formed, and the manufacturing cost is thus increased.

In addition, in the case of resin coating carried out after the formation of external electrodes, there is a need to apply a resin to each of predetermined ceramic surfaces of an electric component by a method such as pattern printing, and the troublesome operation of forming the resin coating film results in expensiveness in manufacturing cost.

Therefore, an object of the present invention is to provide a ceramic electronic component which can have a coating film selectively formed only on a ceramic surface of a ceramic main body, and a method for manufacturing the component.

An aspect of the present invention provides a ceramic electronic component including a ceramic main body, and a coating film and an electrode that are provided on the surface of the ceramic main body, where the coating film includes a resin, and constituent elements of the ceramic main body.

Preferably, the constituent elements of the ceramic main body eluted and deposited from the ceramic main body are contained in the coating film. Furthermore, the constituent elements of the ceramic main body include at least one of Ba, Ti, Ca, Zr, Fe, Ni, Cu, Zn, Mn, Co, Al, and Si. In addition, a plated film may be formed on the external electrode.

In an aspect of the present invention, the coating film includes the resin and the constituent elements of the ceramic main body, and the coating film is selectively formed only on the ceramic surface of the electronic component.

In addition, in the ceramic electronic component according to the present invention, the resin preferably has a thermal decomposition temperature of 240° C. or higher. Furthermore, the resin preferably includes at least one of an epoxy resin, a polyimide resin, a silicone resin, a polyamideimide resin, a PEEK resin, and a fluorine-containing resin. Thus, the ceramic electronic component has high heat resistance.

In addition, in the ceramic electronic component according to the present invention, the coating film preferably contains resin components cross-linked by heating. Thus, the coating film can be formed in a short period of time.

Furthermore, in another aspect, the present invention provides a ceramic electronic component including a ceramic main body, and a coating film and an electrode that are provided on the surface of the ceramic main body.

The coating film is formed on the surface of the ceramic main body by providing, to the surface of the ceramic main body, a resin-containing solution that has the function of etching the surface of the ceramic main body to ionize constituent elements of the ceramic main body.

The coating film includes a constituent element of the ceramic main body, which is ionized and deposited from the ceramic main body, and a resin.

Furthermore, in yet another aspect, the present invention provides a method for manufacturing a ceramic electronic component including a ceramic main body, and a coating film and an electrode that are provided on the surface of the ceramic main body, where a resin-containing solution that has the function of etching the surface of the ceramic main body to ionize constituent elements of the ceramic main body is provided to the surface of the ceramic main body to form, on the surface of the ceramic main body, a coating film including a constituent element of the ceramic main body, which is ionized and deposited from the ceramic main body, and a resin.

Methods for providing the resin-containing solution to the surface of the ceramic main body include methods such as immersion and application. In addition, the resin means a resin that is adjusted to have a polar group such as a carboxyl group and an amino group, and able to be, as an organic substance or a composite of organic and inorganic substances, dissolved or dispersed in a solvent containing water.

Further, in the method for manufacturing a ceramic electronic component according to the present invention, the coating film may be formed on the surface of the ceramic main body after forming an external electrode on the ceramic main body. Alternatively, an external electrode may be formed on the ceramic main body after forming the coating film on the surface of the ceramic main body. Alternatively, the coating film may be formed on the surface of the ceramic main body after forming an external electrode on the ceramic main body and plating the surface of the external electrode.

In an aspect of the present invention, the resin-containing solution etches (dissolves) the surface of the ceramic main body to ionize the constituent elements of the ceramic main body. Then, the resin component dissolved (dispersed) in the resin-containing solution reacts with the ionized constituent elements of the ceramic main body to neutralize the charge of the resin component. As a result, the resin component settles out along with the constituent elements of the ceramic main body, and selectively deposits only on the surface of the ceramic main body.

According to an aspect of the present invention, the coating film can be selectively formed only on the ceramic part without carrying out glass coating or resin coating. Accordingly, the ceramic electronic component can be obtained whose manufacturing cost is inexpensive. In addition, the invention can be also adapted to the ceramic electronic component including electrodes which have a complex shape or microstructure, because the coating film is formed by chemical action.

The foregoing object, and other objects, features, and advantages of the invention will become more evident from the following description of embodiments, which will be provided with reference to the drawings.

DETAILED DESCRIPTION OF THE INVENTION

Embodiments of a ceramic electronic component and a manufacturing method therefor according to the present invention will be described.

1. Ceramic Electronic Component

Ceramic electronic components according to the present invention will be described with reference to a varistor, a multilayer ceramic capacitor, a laminated coil, a PTC thermistor, an NTC thermistor, and an LTCC substrate as examples.

(a) Varistor

Figure 1:
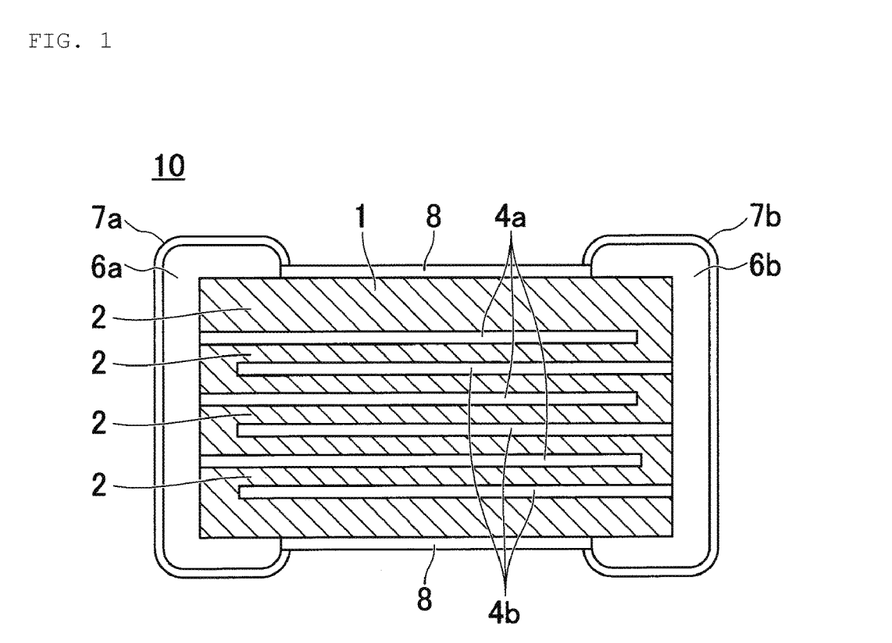
FIG. 1 is a cross-sectional view illustrating an embodiment of a ceramic electronic component according to the present invention.

FIG. 1 is a cross-sectional view illustrating a varistor 10 that is a ceramic electronic component according to the present invention. The varistor 10 includes a substantially cuboidal ceramic main body 1, external electrodes 6a and 6b formed on right and left ends of the ceramic main body 1, and a coating film 8 formed so as to cover four side surfaces of the ceramic main body 1.

The ceramic main body 1 is a laminated body obtained by stacking, in the thickness direction, a number of ceramic layers 2 and multiple pairs of internal electrodes 4a and 4b opposed to each other with the ceramic layers 2 interposed therebetween.

The ceramic layers 2 are composed of a ceramic material obtained by mixing ZnO as a main constituent with $Bi_2O_3$, MnO, $Co_2O_3$, $SnO_2$, $Cr_2O_3$, etc. as accessory constituents.

The internal electrodes 4a have ends extended to the left end surface of the ceramic main body 1, and electrically connected to the external electrode 6a. The internal electrodes 4b have ends extended to the right end surface of the ceramic main body 1, and electrically connected to the external electrode 6b. Thus, a varistor function is achieved at sites with the internal electrodes 4a and 4b opposed. The internal electrodes 4a and 4b are composed of Ag, Cu, Ni, Pd, or an alloy of the metals, etc.

The external electrodes 6a and 6b respectively have, on the surfaces thereof, plated films 7a and 7b formed. The plated films 7a and 7b protect the external electrodes 6a and 6b, and make solderability of the external electrodes 6a and 6b favorable.

On the surface of the ceramic main body 1 excluding the regions with the external electrodes 6a and 6b, a coating film 8 is formed. The coating film 8 includes a resin, and the constituent elements of the ceramic main body 1.

The constituent elements of the ceramic main body 1, which are contained in the coating film 8, are deposited by partial elution from the ceramic layers 2 of the ceramic main body 1. More specifically, the constituent elements of the ceramic main body 1 include Zn, Bi, Mn, Co, Sn, etc. deposited respectively by elution from ZnO, $Bi_2O_2$, MnO, $Co_2O_3$, $SnO_2$, etc. in the ceramic layers 2.

The resin included in the coating film 8 is a polyvinylidene chloride resin, an acrylic resin, an epoxy resin, a polyimide resin, a silicone resin, a polyamideimide resin, a PEEK resin, a fluorine-containing resin, or the like. The ceramic electronic component 10 typically undergoes a mounting step with soldering, and the coating film 8 thus preferably has high heat resistance (240° C. or higher). Accordingly, a resin is preferred which has a thermal decomposition temperature of 240° C. or higher. In this regard, there is a relationship of: (polyvinylidene chloride resin, acrylic resin)<epoxy resin<(polyimide resin, polyamideimide resin, PEEK resin, silicone resin, fluorine-containing resin) in terms of heat resistance.

In the case of the thus configured varistor 10, the coating film 8 includes a resin and the constituent elements of the ceramic main body 1, and the coating film 8 can be selectively formed only on the ceramic surface of the varistor 10. Accordingly, the varistor 10 can be obtained whose manufacturing cost is inexpensive.

(b) Multilayer Ceramic Capacitor

The multilayer ceramic capacitor that is a ceramic electronic component according to the present invention has the same structure as the varistor 10 shown in FIG. 1, and detailed descriptions thereof will be thus left out.

This multilayer ceramic capacitor has a coating film formed on the surface of a ceramic main body excluding the regions with external electrodes. The coating film including a resin and the constituent elements of the ceramic main body is selectively formed only on the ceramic surface of the multilayer ceramic capacitor.

Ceramic layers constituting the ceramic main body are composed of a ceramic material of $Pb(Mg, Nb)O_2$—$PbTiO_2$—$Pb(Cu, W)$—$ZnO$—$MnO_2$ as a main constituent mixed with $Li_2O$—$BaO$—$B_2O_2$—$SiO_2$ as an anti-reducing agent, or a ceramic material containing $CaZrO_3$—$CaTiO_3$ as its main constituent. Therefore, the constituent elements of the ceramic main body, which are contained in the coating films, include Pb, Mg, Nb, Ti, Ba, Li, Zn, Mn, Si, Ca, and Zr each eluted and deposited from $Pb(Mg, Nb)O_3$—$PbTiO_3$—$Pb(Cu, W)$—$ZnO$—$MnO_2$, $Li_2O$—$BaO$—$B_2O_2$—$SiO_2$, $CaZrO_2$—$CaTiO_2$, or the like of the ceramic layers.

Furthermore, the resin included in the coating film is a polyvinylidene chloride resin, an acrylic resin, an epoxy resin, a polyimide resin, a silicone resin, a polyamideimide resin, a PEEK resin, a fluorine-containing resin, or the like.

(c) Laminated Coil

The laminated coil that is a ceramic electronic component according to the present invention has the same structure as well-known laminated coils, and detailed descriptions thereof will be thus left out.

This laminated coil has a coating film formed on the surface of a ceramic main body excluding the regions with external electrodes. The coating film including a resin and the constituent elements of the ceramic main body is selectively formed only on the ceramic surface of the laminated coil.

Ceramic layers constituting the ceramic main body are composed of a magnetic ceramic material such as a Cu—Zn ferrite and a Ni—Zn ferrite. Therefore, the constituent elements of the ceramic main body, which are contained in the coating film, include Sr, Sn, Fe, Ni, Cu, Zn, Mn, and Co each eluted and deposited from the Cu—Zn ferrite, Ni—Zn ferrite, or the like of the ceramic layers.

Furthermore, the resin included in the coating film is a polyvinylidene chloride resin, an acrylic resin, an epoxy resin, a polyimide resin, a silicone resin, a polyamideimide resin, a PEEK resin, a fluorine-containing resin, or the like.

(d) PTC Thermistor and NTC Thermistor

The PTC thermistor and NTC thermistor that are ceramic electronic components according to the present invention has the same structure as well-known thermistors, and detailed descriptions thereof will be thus left out.

This PTC thermistor and the NTC thermistor have coating films formed on the surfaces of ceramic bodies excluding the regions with external electrodes. The coating films including a resin and the constituent elements of the ceramic main bodies are selectively formed only on the ceramic surfaces of the PTC thermistor and NTC thermistor.

Ceramic layers constituting the ceramic main body of the PTC thermistor are composed of, for example, a ceramic material of $BaTiO_3$ as a main constituent with $Y_2O_3$ as a semiconducting agent, $SiO_2$ and $Al_2O_3$ as a curing agent, and $MnO_2$ as a property improving agent each added thereto and mixed therein. Therefore, the constituent elements of the ceramic main body, which are contained in the coating film of the PTC thermistor, include Ba, Ti, Y, Si, and Mn each eluted and deposited from $BaTiO_2$, $Y_2O_3$, $SiO_2$, $Al_2O_3$, or $MnO_2$ of the ceramic layers.

On the other hand, ceramic layers constituting the ceramic main body of the NTC thermistor are composed of, for example, a ceramic material of $Mn_3O_4$, NiO, $Co_2O_3$, etc. mixed. Therefore, the constituent elements of the ceramic main body, which are contained in the coating film of the NTC thermistor, include Mn, Ni, and Co each eluted and deposited from $Mn_3O_4$, NiO, $Co_2O_3$, or the like of the ceramic layers.

Furthermore, the resin included in the coating film is a polyvinylidene chloride resin, an acrylic resin, an epoxy resin, a polyimide resin, a silicone resin, a polyamideimide resin, a PEEK resin, a fluorine-containing resin, or the like.

(e) LTCC Substrate (Low Temperature Co-fired Ceramics Multilayer Substrate)

Figure 2:
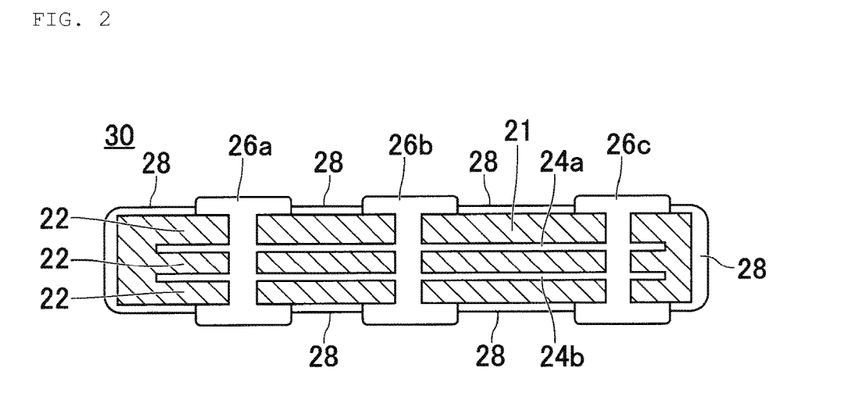
FIG. 2 is a cross-sectional view illustrating another embodiment of a ceramic electronic component according to the present invention.

FIG. 2 is a cross-sectional view illustrating an LTCC substrate 30 that is a ceramic electronic component according to the present invention. The LTCC substrate 30 includes a ceramic main body (ceramic multilayer substrate) 21, through-hole electrodes 26a, 26a, and 26c formed in the ceramic main body 21, and a coating film 28 formed so as to cover the ceramic main body 21.

The ceramic main body 21 is a laminated body obtained by stacking a number of ceramic layers 22 and a number of internal circuit electrode layers 24a and 24b in the thickness direction. The through-hole electrodes 26a, 26b, and 26c electrically connects the internal circuit electrode layers 24a and 24b and the front and back surfaces of the ceramic main body 21.

The ceramic layers 22 are composed of a ceramic material of LTCC (for example, crystallized glass mixed with $Al_2O_3$, $ZrSiO_4$, or the like).

The through-hole electrodes 26a, 26a, and 26c have, if necessary, a plated film formed on the surfaces thereof.

On the surface of the ceramic main body 21 excluding the regions with the through-hole electrodes 26a, 26a, and 26c, the coating film 28 is formed. The coating film 28 includes a resin, and the constituent elements of the ceramic main body 21.

The constituent elements of the ceramic main body 21, which are contained in the coating film 28, are deposited by partial elution from the ceramic layers 22. More specifically, the constituent elements of the ceramic main body 21 include Si, Al, B, and Ca each deposited by elution from the ceramic material of LTCC in the ceramic layers 22.

Furthermore, the resin included in the coating film is a polyvinylidene chloride resin, an acrylic resin, an epoxy resin, a polyimide resin, a silicone resin, a polyamideimide resin, a PEEK resin, a fluorine-containing resin, or the like.

In the case of the thus configured LTCC substrate 30, the coating film 28 includes a resin and the constituent elements of the ceramic main body 21, and the coating film 28 can be selectively formed only on the ceramic surface of the LTCC substrate 30. Accordingly, the LTCC substrate 30 can be obtained whose manufacturing cost is inexpensive.

2. Method for Manufacturing Ceramic Electronic Component

Next, a method for manufacturing the ceramic electronic component according to the present invention will be described with reference to the varistor 10 as an example.

Figure 3:
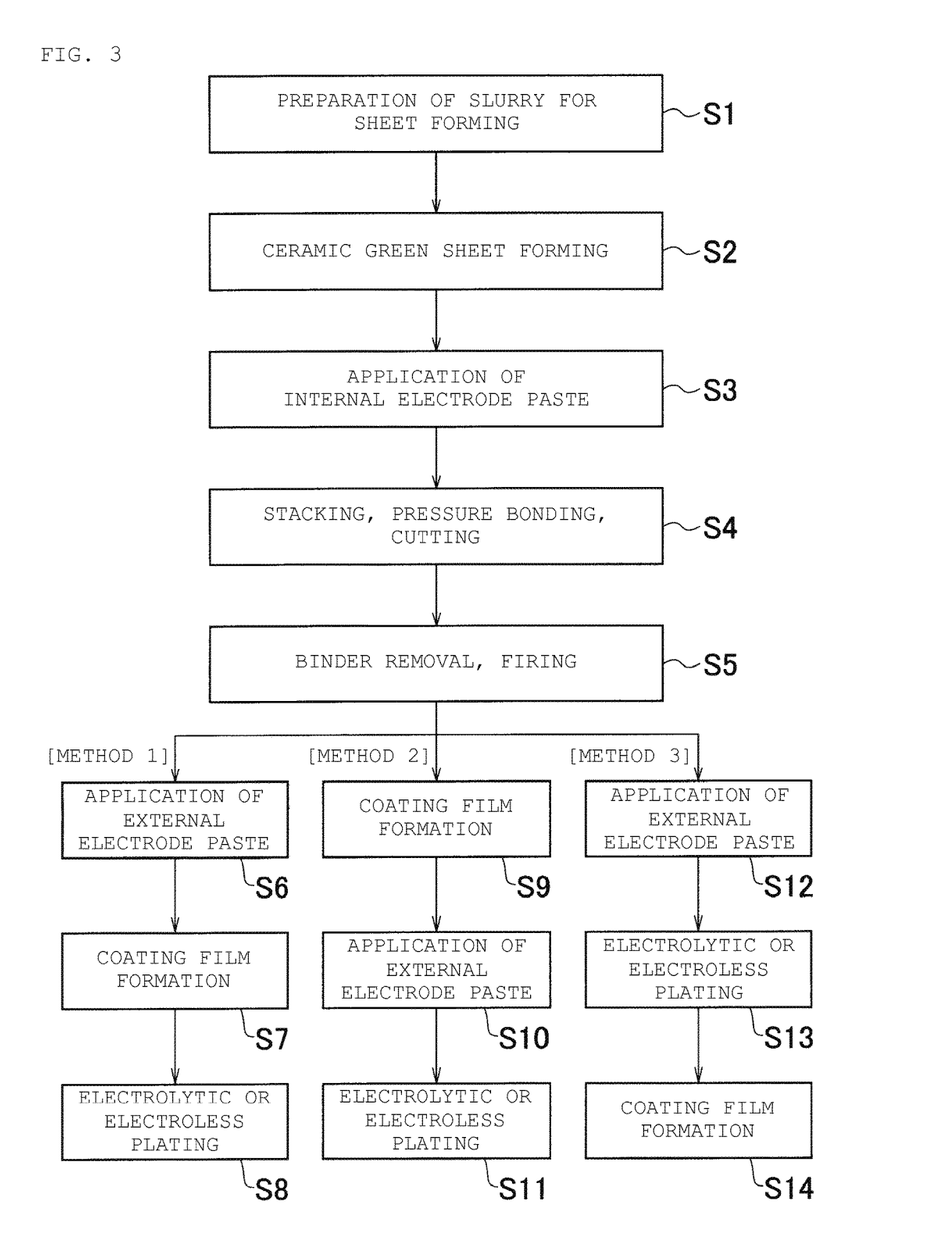
FIG. 3 is a flowchart showing an embodiment of a method for manufacturing the ceramic electronic component according to the present invention.

FIG. 3 is a flowchart showing a method for manufacturing the varistor 10.

In a step S1, slurry for sheet forming is prepared in such a way that an organic binder, a dispersant, and a plasticizer, etc. are added to a mixed material obtained by mixing ZnO as a main constituent with $Bi_2O_3$, MnO, $CO_2O_3$, $SnO_2$, $Cr_2O_3$, etc. as accessory constituents.

Next, in a step S2, the slurry for sheet forming is formed into sheets by a doctor blade method to provide rectangular ceramic green sheets.

Next, in a step S3, an internal electrode paste containing Ag is applied onto the ceramic green sheets by a screen printing method to form electrode paste films to serve as the internal electrodes 4a and 4b.

Next, in a step S4, the multiple ceramic green sheets with the electrode paste films formed are stacked so as to alternate directions in which ends of the electrode paste films are extended, and subjected to pressure bonding. This laminated ceramic green sheet is cut into a size for individual ceramic main bodies 1 to provide a number of unfired ceramic main bodies 1.

Next, in a step S5, the unfired ceramic main bodies 1 are subjected to binder removal treatment at 400° C. to 500° C. Thereafter, the unfired ceramic main bodies 1 are subjected to firing for 2 hours at a temperature of 900° C. to 1000° C. to provide sintered ceramic main bodies 1. The ceramic green sheets and the electrode paste films are subjected to co-firing, and the ceramic green sheets serve as the ceramic layers 2, whereas the electrode paste films serve as the internal electrodes 4a and 4b.

Further, in the subsequent step, there are three types of manufacturing methods [Method 1] to [Method 3] shown.

(a) In the case of [Method 1]

In the case of the manufacturing method [Method 1], in a step S6, an external electrode paste (AgPd alloy paste) is applied to both ends of the sintered ceramic main bodies 1. Thereafter, on the sintered ceramic main bodies 1, the external electrode paste is baked at a temperature of 900° C. to form the external electrodes 6a and 6b electrically connected respectively to the internal electrodes 4a and 4b.

Next, in a step S7, to the ceramic main bodies 1, a resin-containing solution is provided by an immersion method, or applied by spin coating. The resin-containing solution has the function of etching the surfaces of the ceramic main bodies 1 to ionize the constituent elements of the ceramic main bodies 1, and includes a resin component dissolved or dispersed in a solvent containing water. Furthermore, the resin-containing solution includes a neutralizer, a polar solvent, and a surfactant, etc. for dissolution or dispersion of the resin component, if necessary. It is to be noted that after providing the resin-containing solution, after a predetermined period of time, the ceramic main bodies 1 are washed with pure water, if necessary.

Therefore, the resin-containing solution etches (dissolves) the surfaces of the ceramic main bodies 1 to ionize the constituent elements of the ceramic main bodies 1. In regard to the etching (dissolving) function of the resin-containing solution, the etching (dissolving) reaction can be developed by adjusting the pH just with the constituents of the resin-containing solution without adding any etching promoting constituent such as halogen, because the main constituent is ZnO in the case of the varistor 10. More specifically, the etching (dissolving) reaction proceeds when the pH of the resin-containing solution is set in a pH range (pH<5, pH>11) in which Zn is present stably as ions.

Then, the resin component dissolved (dispersed) in the resin-containing solution reacts with the ionized constituent elements of the ceramic main bodies 1 to neutralize the charge of the resin component. As a result, the resin component settles out along with the constituent elements of the ceramic main bodies 1, and selectively deposits only on the ceramic surfaces of the ceramic main bodies 1. Accordingly, the dissolved and ionized constituent elements of the ceramic main bodies 1 are co-deposited in the deposited resin component.

On the other hand, the resin component is not deposited on the parts with the external electrodes 6a and 6b formed. In this case, at the interfaces between the ceramic and the external electrodes 6a and 6b, the resin component may slightly extend on the surfaces of the external electrodes 6a and 6b. This is believed to be the resin component deposited on the ceramic surfaces, which slightly extends to the external electrodes 6a and 6b, rather than the deposition reaction proceeding at the surfaces of the external electrodes 6a and 6b.

The resin included in the resin-containing solution is a polyvinylidene chloride resin, an acrylic resin, an epoxy resin, a polyimide resin, a silicone resin, a polyamideimide resin a PEEK resin, a fluorine-containing resin, or the like, but basically, it does not matter what kind as long as the resin is deposited by the present treatment.

In this way, the coating film 8 including the constituent elements of the ceramic main bodies 1, which are ionized and deposited from the ceramic main bodies 1, and the resin is formed on the surfaces of the ceramic main bodies 1. Thereafter, the coating film 8 is subjected to heating treatment. The heating treatment is intended to accelerate a cross-linking reaction between the resin components in the resin-containing solution deposited, and the heating condition varies depending on the type of the resin component. In general, the cross-linking reaction is likely to proceed under high temperature. However, the excessively increased temperature increases the decomposition reaction of the resin component. Accordingly, there is a need to set optimum temperature and time in accordance with the resin component.

Figure 4:
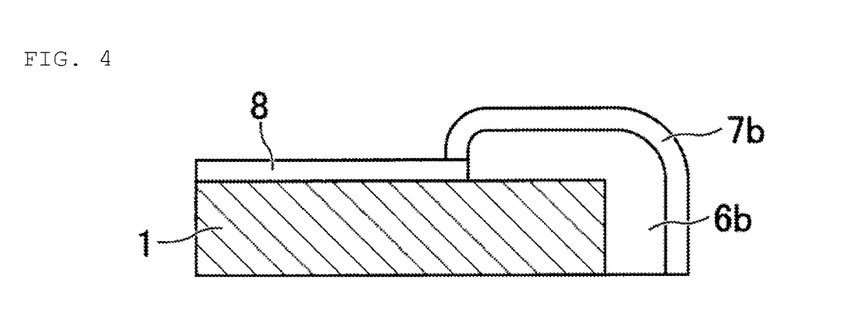
FIG. 4 is an enlarged cross-sectional view of an external electrode.

Next, in a step S8, the plated films 7a and 7b are formed on the external electrodes 6a and 6b by an electrolytic or electroless plating method. The plated films 7a and 7b adopt, for example, a double structure composed of a Ni plated film as a lower layer and an Sn plated film as an upper layer. FIG. 4 is an enlarged cross-sectional view of a site with the external electrode 6b formed by the manufacturing method [Method 1].

In this way, the coating film 8 can be selectively formed only on the ceramic part without carrying out glass coating or resin coating. Accordingly, the varistor 10 whose manufacturing cost is inexpensive can be manufactured with favorable mass productivity. In addition, the method can be also adapted to the varistor 10 including the external electrodes 6a and 6b which have a complex shape or microstructure, because the coating film 8 is formed by chemical action.

(b) In the case of [Method 2]

In addition, in the case of the manufacturing method [Method 2], in a step S9, to the ceramic main bodies 1, a resin-containing solution is provided by an immersion method, or applied by spin coating. The resin-containing solution etches (dissolves) the surfaces of the ceramic main bodies 1 to ionize the constituent elements of the ceramic main bodies 1. Then, the resin component dissolved (dispersed) in the resin-containing solution reacts with the ionized constituent elements of the ceramic main bodies 1 to neutralize the charge of the resin component. As a result, the resin component settles out along with the constituent elements of the ceramic main bodies 1, and deposits over substantially the entire surfaces of the ceramic main bodies 1. Accordingly, the dissolved and ionized constituent elements of the ceramic main bodies 1 are co-deposited in the deposited resin component. It is to be noted that after providing the resin-containing solution, after a predetermined period of time, the ceramic main bodies 1 are washed with pure water, if necessary.

In this way, the coating film 8 including the constituent elements of the ceramic main bodies 1, which are ionized and deposited from the ceramic main bodies 1, and the resin is formed over substantially the entire surfaces of the ceramic main bodies 1. Thereafter, the coating film 8 is subjected to heating treatment. It is to be noted that the coating film 8 is not formed on extensions of the internal electrodes 4a and 4b, which are exposed at both right and left end surfaces of the ceramic main bodies 1, in this case.

Next, in a step S10, an external electrode paste is applied to both ends of the ceramic main bodies 1.

Thereafter, on the ceramic main bodies 1, the external electrode paste is baked at a temperature at which the coating film 8 undergoes no thermal decomposition to form the external electrodes 6a and 6b electrically connected respectively to the internal electrodes 4a and 4b.

Figure 5:
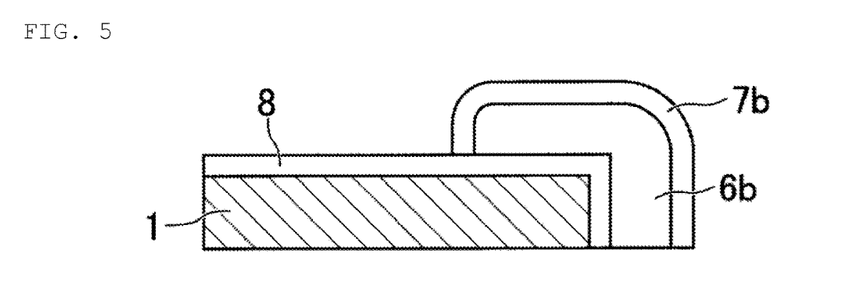
FIG. 5 is an enlarged cross-sectional view of another external electrode.

Next, in a step S11, the plated films 7a and 7b are formed on the external electrodes 6a and 6b by an electrolytic or electroless plating method. FIG. 5 is an enlarged cross-sectional view of a site with the external electrode 6b formed by the manufacturing method [Method 2].

(c) In the case of [Method 3]

In addition, in the case of the manufacturing method [Method 3], in a step S12, an external electrode paste is applied to both ends of the ceramic main bodies 1. Thereafter, on the ceramic main bodies 1, the external electrode paste is baked at a temperature of 900° C. to form the external electrodes 6a and 6b electrically connected respectively to the internal electrodes 4a and 4b.

Next, in a step S13, the plated films 7a and 7b are formed on the external electrodes 6a and 6b by an electrolytic or electroless plating method.

Next, in a step S14, to the ceramic main bodies 1, a resin-containing solution is provided by an immersion method, or applied by spin coating. The resin-containing solution etches (dissolves) the surfaces of the ceramic main bodies 1 to ionize the constituent elements of the ceramic main bodies 1. Then, the resin component dissolved (dispersed) in the resin-containing solution reacts with the ionized constituent elements of the ceramic main bodies 1 to neutralize the charge of the resin component. As a result, the resin component settles out along with the constituent elements of the ceramic main bodies 1, and selectively deposits only on the ceramic surfaces of the ceramic main bodies 1. Accordingly, the dissolved and ionized constituent elements of the ceramic main bodies 1 are co-deposited in the deposited resin component. On the other hand, the resin component is not deposited on the parts with the external electrodes 6a and 6b formed. It is to be noted that after providing the resin-containing solution, after a predetermined period of time, the ceramic main bodies 1 are washed with pure water, if necessary.

Figure 6:
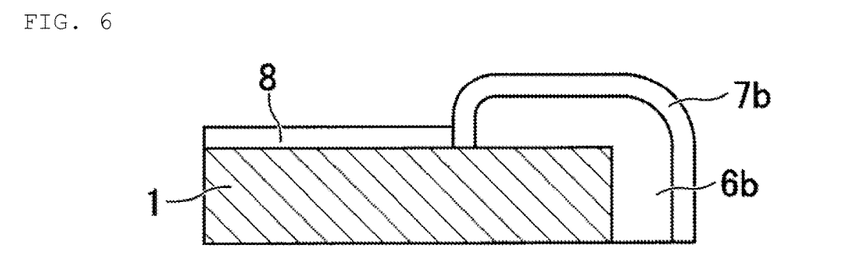
FIG. 6 is an enlarged cross-sectional view of yet another external electrode.

In this way, the coating film 8 including the constituent elements of the ceramic main bodies 1, which are ionized and deposited from the ceramic main bodies 1, and the resin is formed on the surfaces of the ceramic main bodies 1. Thereafter, the coating film 8 is subjected to heating treatment. FIG. 6 is an enlarged cross-sectional view of a site with the external electrode 6b formed by the manufacturing method [Method 3].

EXAMPLES

1. Examples and Comparative Examples

Respective ceramic electronic components (varistors, multilayer ceramic capacitors, laminated coils, PTC thermistors, NTC thermistors, LTCC substrates) according to examples and comparative examples were prepared, and subjected to characterization.

2. Preparation of Examples and Comparative Examples (a) Examples 1 to 9

As shown in Table 1, the varistor 10 with the coating film 8 provided on the surface of the ceramic main body 1 was prepared by the manufacturing method [Method 1] according to the embodiment described previously.

As the resin-containing solution, a commercially available latex of a resin component dispersed in a solvent containing water was used with an etching promoting constituent added thereto, if necessary.

As the resin-containing solutions according to Examples 1 to 3, an acrylic resin (Trade Name: Nipol LX814A (from Zeon Corporation)) as the resin component was used through the adjustment of the pH to 2.0, 3.0, and 4.0 respectively with the addition of a sulfuric acid as the etching promoting constituent to the resin.

As the resin-containing solution according to Example 4, a polyvinylidene chloride resin (Trade Name: Saran Latex L232A (from Asahi Kasei Chemicals Corp.)) as the resin component was used through the addition of a 10% sulfuric acid as the etching promoting constituent thereto for a concentration of 1 vol % and the adjustment of the pH to 3.0 with a potassium hydroxide solution.

As the resin-containing solution according to Example 5, a product of polyvinylidene chloride resin (Trade Name: Saran Latex L232A (from Asahi Kasei Chemicals Corp.)) as the resin component was used without being adjusted (pH: 2.0).

As the resin-containing solution according to Example 6, a silicone resin (Trade Name: X-51-1218 (from Shin-Etsu Chemical Co., Ltd.)) as the resin component was used through the adjustment of the pH to 3.0 with the addition of a sulfuric acid as the etching promoting constituent to the resin.

As the resin-containing solution according to Example 7, a fluorine-containing resin (Trade Name: Fluon PTFE AD-916E (from Asahi Glass Co., Ltd.)) as the resin component was used through the adjustment of the pH to 2.0 with the addition of a sulfuric acid as the etching promoting constituent to the resin.

As the resin-containing solution according to Example 8, an acrylic resin (Trade Name: Nipol LX814A (from Zeon Corporation)) was used through the adjustment of the pH to 4.0 with the addition of a hydrochloric acid as the etching promoting constituent to the resin.

As the resin-containing solution according to Example 9, an acrylic resin (Trade Name: Nipol LX814A (from Zeon Corporation)) was used through the adjustment of the pH to 4.0 with the addition of a nitric acid as the etching promoting constituent to the resin.

The coating film 8 was formed on the surface of the ceramic main body 1 in such a way that the ceramic main body 1 was immersed for 3 minutes in the resin-containing solution at room temperature, then washed with pure water, and subjected to heat treatment at 80° C. for 30 minutes.

(b) Examples 10 to 14

As shown in Table 1, a multilayer ceramic capacitor (Example 10), a laminated coil (Example 11), a PTC thermistor (Example 12), an NTC thermistor (Example 13), and an LTCC substrates (Example 14) with the coating film provided on the surfaces of respective ceramic main bodies were prepared by the manufacturing method [Method 1] according to the above-described embodiment.

As the resin-containing solutions according to Examples 10 to 14, an acrylic resin (Trade Name: Nipol LX814A (from Zeon Corporation)) as the resin component was used through the adjustment of the pH to 3.0 with the addition of a sulfuric acid as the etching promoting constituent to the resin.

The coating film was formed on the surface of the ceramic main body in such a way that the ceramic main body was immersed for 10 minutes in the resin-containing solution at room temperature, then washed with pure water, and subjected to heat treatment at 80° C. for 30 minutes.

(c) Comparative Examples 1 to 6

As shown in Table 1, a varistor (Comparative Example 1), a multilayer ceramic capacitor (Comparative Example 2), a laminated coil (Comparative Example 3), a PTC thermistor (Comparative Example 4), an NTC thermistor (Comparative Example 5), and an LTCC substrate (Comparative Example 6) were prepared without any coating films formed on the surfaces of ceramic main bodies.

3. Characterization and Evaluation Methods in Examples and Comparative Examples

The prepared ceramic electronic components according to Examples 1 to 14 and Comparative Examples 1 to 6 were subjected to the following characterization.

(a) Deposition by Plating on Ceramic Part (Selective Deposition)

The deposition by electrolytic plating on the surface (the region excluding the external electrodes, but including the surface of the coating film) of the ceramic part was determined by visual check of the appearance after electrolytic Ni plating and electrolytic Sn plating. The case where there was no deposition by electrolytic plating on the surface of the ceramic part was regarded as "○". The case of island-shaped deposition by electrolytic plating on the surface of the ceramic part, or the case of projecting deposition by electrolytic plating, extending from an end of the external electrode to the ceramic, was regarded as "Δ". The case of deposition by electrolytic plating over the entire surface of the ceramic part was regarded as "×".

(b) Plating Adhesion

The plating adhesion was determined by visual examination of the appearance after electrolytic Ni plating and electrolytic Sn plating. This evaluation of plating adhesion also involves the evaluation on no coating film formed on the external electrodes. The case of adhesion by electrolytic plating on the surfaces of all of the external electrodes was regarded as "○". The case where there was not adhesion by electrolytic plating on the surfaces of all of the external electrodes was regarded as "×".

4. Characterization Result in Examples and Comparative Examples

Table 1 shows the results of the characterization of Examples 1 to 14 and Comparative Examples 1 to 6.

TABLE 1

| | | Electronic Component | Coating Film | Resin-Containing Solution | pH | Immersion Time | Deposition by Plating on Ceramic Part | Plating Adhesion |
|---|---|---|---|---|---|---|---|---|
| Example | 1 | Varistor | Yes | Nipol LX814A + Sulfuric Acid | 2.0 | 3 minutes | ○ | ○ |
| | 2 | | | | 3.0 | | ○ | ○ |
| | 3 | | | | 4.0 | | ○ | ○ |
| | 4 | | | Saran Latex L232A + 10% Sulfuric Acid + Potassium Hydroxide | 3.0 | | ○ | ○ |
| | 5 | | | Saran Latex L232A | 2.0 | | ○ | ○ |
| | 6 | | | X-51-1218 + Sulfuric Acid | 3.0 | | ○ | ○ |
| | 7 | | | Fluon PTFE AD-916E + Sulfuric Acid | 2.0 | | ○ | ○ |
| | 8 | | | Nipol LX814A + Hydrochloric Acid | 4.0 | | ○ | ○ |
| | 9 | | | Nipol LX814A + Nitric Acid | 4.0 | | ○ | ○ |
| | 10 | Multilayer Ceramic Capacitor | Yes | Nipol LX814A + Sulfuric Acid | 3.0 | 10 minutes | ○ | ○ |
| | 11 | Laminated Coil | | | | | ○ | ○ |
| | 12 | PTC Thermistor | | | | | ○ | ○ |
| | 13 | NTC Thermistor | | | | | ○ | ○ |
| | 14 | LTCC Substrate | | | | | ○ | ○ |
| Comparative Example | 1 | Varistor | No | — | — | — | × | ○ |
| | 2 | Multilayer Ceramic Capacitor | | | | | Δ | ○ |
| | 3 | Laminated Coil | | | | | × | ○ |
| | 4 | PTC Thermistor | | | | | × | ○ |
| | 5 | NTC Thermistor | | | | | × | ○ |
| | 6 | LTCC Substrate | | | | | Δ | ○ |

From Table 1, it is determined that the deposition by plating on the ceramic part is disadvantageous even with favorable plating adhesion in the case of Comparative Examples 1 to 6 (in the case of the ceramic electronic components without any coating film formed).

On the other hand, it is determined that the deposition by plating on the ceramic part and the plating adhesion are both favorable in the case of Examples 1 to 14 (in the case of the ceramic electronic components with the coating films formed).

It is to be noted that the invention is not to be considered limited to the previously described embodiments, but can be modified variously within the scope of the invention.

What is claimed is:

1. A ceramic electronic component comprising:
   a ceramic main body;
   a coating film on a surface of the ceramic main body; and
   an electrode adjacent the surface of the ceramic main body,
   wherein the coating film comprises a resin, and a constituent element of the ceramic main body, and the constituent element of the ceramic main body is an element that was eluted from the ceramic main body.

2. The ceramic electronic component according to claim 1, wherein the constituent element of the ceramic main body comprises at least one of Ba, Ti, Ca, Zr, Fe, Ni, Cu, Zn, Mn, Co, Al and Si.

3. The ceramic electronic component according to claim 1, wherein the resin has a thermal decomposition temperature of 240° C. or higher.

4. The ceramic electronic component according to claim 1, wherein the resin comprises at least one of an epoxy resin, a polyimide resin, a silicone resin, a polyamideimide resin, a PEEK resin, and a fluorine-containing resin.

5. The ceramic electronic component according to claim 1, wherein the coating film contains cross-linked resin components.

6. The ceramic electronic component according to claim 1, further comprising a plated film on the electrode.

7. The ceramic electronic component according to claim 1, wherein the electrode is on a surface of the coating film.

8. A ceramic electronic component comprising:
   a ceramic main body;
   a coating film on a surface of the ceramic main body; and
   an electrode adjacent the surface of the ceramic main body,
   wherein the coating film is formed on the surface of the ceramic main body by providing, to the surface of the ceramic main body, a resin-containing solution that etches the surface of the ceramic main body so as to ionize a constituent element of the ceramic main body, and
   the coating film comprises a resin and a constituent element of the ceramic main body, the constituent element being ionized and deposited from the ceramic main body.

* * * * *